(12) United States Patent
Chida et al.

(10) Patent No.: US 11,041,874 B2
(45) Date of Patent: Jun. 22, 2021

(54) AUTOMATIC ANALYZER

(71) Applicant: Hitachi High-Technologies Corporation, Tokyo (JP)

(72) Inventors: Saori Chida, Tokyo (JP); Yoichi Aruga, Tokyo (JP); Akihiro Yasui, Tokyo (JP); Yoshiki Muramatsu, Tokyo (JP); Yoko Inoue, Tokyo (JP); Hideto Tamezane, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 232 days.

(21) Appl. No.: 16/086,085

(22) PCT Filed: Jan. 31, 2017

(86) PCT No.: PCT/JP2017/003256
§ 371 (c)(1),
(2) Date: Sep. 18, 2018

(87) PCT Pub. No.: WO2017/163613
PCT Pub. Date: Sep. 28, 2017

(65) Prior Publication Data
US 2020/0096529 A1    Mar. 26, 2020

(30) Foreign Application Priority Data
Mar. 25, 2016    (JP) ............................... JP2016-061085

(51) Int. Cl.
*G01N 35/10*    (2006.01)
*G01N 21/59*    (2006.01)
(Continued)

(52) U.S. Cl.
CPC ......... *G01N 35/1004* (2013.01); *G01N 21/59* (2013.01); *G01N 35/04* (2013.01);
(Continued)

(58) Field of Classification Search
None
See application file for complete search history.

(56) References Cited

U.S. PATENT DOCUMENTS

| 2003/0092185 A1* | 5/2003 | Qureshi | ............ G01N 35/0092 436/43 |
| 2008/0099057 A1* | 5/2008 | Dunfee | ............. G01N 35/1004 134/94.1 |

FOREIGN PATENT DOCUMENTS

| JP | 2009-222453 A | 10/2009 |
| JP | 2010-019746 A | 1/2010 |

(Continued)

OTHER PUBLICATIONS

English translation of JP-2010019746-A. (Year: 2020).*
International Search Report of PCT/JP2017/003256 dated May 9, 2017.

*Primary Examiner* — Matthew D Krcha
(74) *Attorney, Agent, or Firm* — Mattingly & Malur, PC

(57) ABSTRACT

The automatic analyzer includes: a member to be washed, such as a probe or a stirrer for contacting and stirring a liquid; a wash station in which the member to be washed is washed with a washing liquid; and a measuring part that measures an optical characteristic of an evaluation reagent contained in a reaction cell. A control unit brings the member to be washed that has been washed in the wash station into contact with the evaluation reagent, causes the measuring part to measure the optical characteristic after contact with the evaluation reagent, and calculates the amount of the washing liquid carried into the reaction cell by the member to be washed, based on the measured optical characteristic.

10 Claims, 5 Drawing Sheets

(51) Int. Cl.
*G01N 35/04* (2006.01)
*G01N 35/00* (2006.01)

(52) U.S. Cl.
CPC .............. *G01N 2035/00534* (2013.01); *G01N 2035/0443* (2013.01); *G01N 2035/0444* (2013.01)

(56) References Cited

FOREIGN PATENT DOCUMENTS

| | | | |
|---|---|---|---|
| JP | 2010019746 A | * | 1/2010 |
| JP | 2012-220436 A | | 11/2012 |
| JP | 2015-200527 A | | 11/2015 |

* cited by examiner

FIG. 4

| REACTION CELL NO. | MEASUREMENT WAVELENGTH [nm] | ABSORBANCE BEFORE OPERATION [×10⁻⁴] | ABSORBANCE AFTER OPERATION [×10⁻⁴] | WATER CARRY-IN AMOUNT [μL/TIME] |
|---|---|---|---|---|
| 1 | 480 (MAIN) | 25721 | 25370 | 0.32 |
| | 570 (SUB) | 8803 | 8802 | |
| | (MAIN − SUB) | 16918 | 16568 | |
| 2 | 480 (MAIN) | 25670 | 25312 | 0.33 |
| | 570 (SUB) | 8796 | 8798 | |
| | (MAIN − SUB) | 16874 | 16514 | |
| 3 | 480 (MAIN) | 25737 | 25374 | 0.33 |
| | 570 (SUB) | 8801 | 8801 | |
| | (MAIN − SUB) | 16936 | 16573 | |
| | | | AVERAGE | 0.33 |

AUTOMATIC ANALYZER

TECHNICAL FIELD

The present invention relates to an automatic analyzer having a washing liquid carry-in amount evaluation method.

BACKGROUND ART

An extracorporeal diagnostic automatic analyzer to perform component analysis on a biological sample such as blood, blood plasma and urine is indispensable for current diagnosis by virtue of its reproducibility and accuracy.

For example, in the automatic analyzer, when a washing liquid such as washing water attached to a washed probe or stirrer is carried in a sample or a reagent, deterioration of the sample or the reagent and degradation of measurement result are caused. As the measure, an automatic analyzer mounted with a water drop removing mechanism such as a drying component using vacuum suction, a blower to blow off washing liquid with a wind, or a wiper to wipe off the washing liquid, is known.

However, as the method of checking the amount of washing liquid attached to the probe or the stirrer is visual checking or evaluation by manual inspection, it is not easy for a user or a service person to measure the washing liquid carry-in amount, and it has not been easy to determine whether or not the water drop removing mechanism normally functions.

Patent Literature 1 discloses a technique of checking the washing performance of an automatic analyzer with ease.

Patent Literature

Patent Literature 1: Japanese Unexamined Patent Application Publication No. 2012-220436

Technical Problem

The Patent Literature 1 discloses a technique of evaluating the washing performance of a probe or a stirrer with ease by using a dye solution. However, it is not a technique of measuring the amount of washing liquid, attached to the probe or the stirrer, carried in a sample or a reagent and determining whether or not a water drop removing mechanism normally functions.

Accordingly, an object of the present invention is to provide an automatic analyzer having a mechanism to wash a probe or a stirrer, which enables automatic measurement of a washing-liquid carry-in amount and, when provided with a water drop removing mechanism, enables checking whether or not the mechanism normally functions, with ease.

Solution to Problem

A typical configuration of the present invention to solve the above-described object is as follows.

The present invention provides: an automatic analyzer comprising: a member to be washed that is any one of a reagent probe for dispensing a reagent into a reaction cell, a sample probe for dispensing a sample into the reaction cell, and a stirring mechanism for contacting and stirring a liquid in the reaction cell; a wash station in which the member to be washed is washed with a washing liquid; a measuring part for measuring an optical characteristic of an evaluation reagent contained in the reaction cell; and a control unit for controlling the member to be washed, the wash station and the measuring part, wherein the control unit brings the member to be washed that has been washed in the wash station into contact with the evaluation reagent, and the control unit causes the measuring part to measure the optical characteristic after the contact with the evaluation reagent, and calculates the amount of the washing liquid carried into the reaction cell by the member to be washed, based on the measured optical characteristic.

ADVANTAGEOUS EFFECTS OF INVENTION

According to the present invention, it is possible to automatically measure the washing-liquid carry-in amount with the probe or the stirrer. Consequently, it is possible to grasp abnormality of the water drop removing mechanism.

Other objects, the configurations and advantages of the present invention than those described above may be clearer with the following description of embodiments.

BRIEF DESCRIPTION OF THE DRAWINGS

FIG. 4 is an output diagram of measurement results in the automatic analyzer to which the present invention has been applied.

DESCRIPTION OF EMBODIMENTS

Hereinbelow, embodiments of the present invention will be described using the drawings.

First Embodiment

Figure 1:
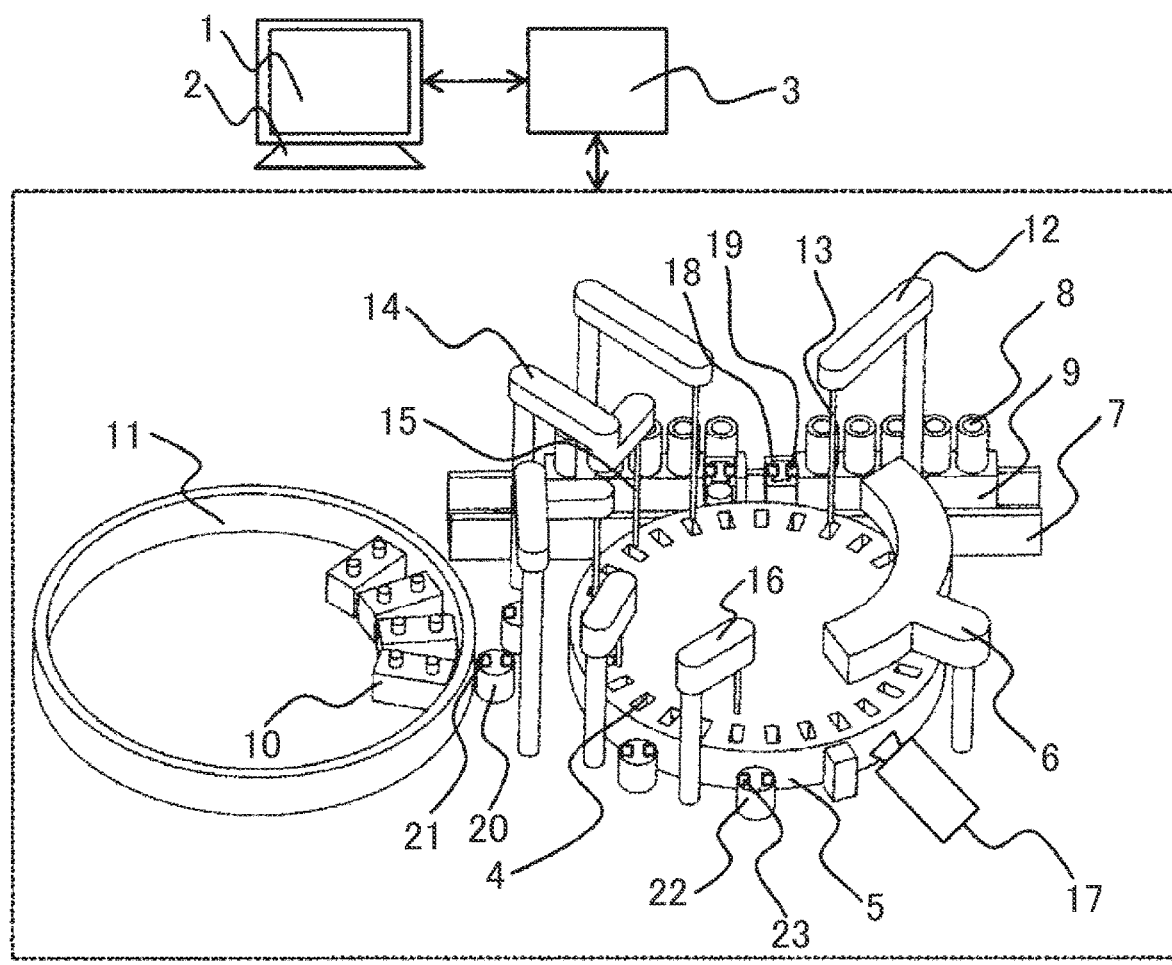
FIG. 1 is a conceptual diagram of an automatic analyzer to which the present invention has been applied.

FIG. 1 is a conceptual diagram of an automatic analyzer to which the present invention has been applied.

Using FIG. 1, the respective mechanisms will be described. The automatic analyzer is provided with a computer 1 accompanied with an input device 2 (a keyboard or a touch panel). The computer 1 includes a storage unit and a display unit so as to store information required for analysis and measurement results in the storage unit and display them on the display unit. Note that the storage unit is a memory such as a hard disk, a DRAM or a flash memory. The display unit is a display such as a cathode ray tube or a liquid crystal display.

The automatic analyzer has a control unit 3 to control the respective mechanisms of the automatic analyzer. The respective mechanisms to be described below utilize the mechanism control with the control unit 3. Note that the control unit 3 is a controller such as a CPU or an arithmetic circuit.

The automatic analyzer has a reaction disk 5 in which a reaction cell 4 is arranged in a circumferential shape. The reaction disk 5 is rotated with a driving mechanism such as a motor, to move or withdraw the reaction cell 4 in correspondence with analysis process. Hereinbelow, the movement and withdrawal of the reaction cell 4 will be described as rotation of the reaction disk 5 under the control of the own automatic analyzer. Further, the reaction cell 4 is a vessel in which a sample or a reagent is dispensed, and further, it is also available as a vessel for photometry for optical measurement of the dispensed solution without any operation.

A reaction vessel washing mechanism 6, to suck a liquid in the reaction cell 4, discharge a detergent and water, and wash the inside of the reaction cell 4, in correspondence with analysis process, is provided on the reaction disk 5.

The automatic analyzer is provided with a sample conveying mechanism 7. Plural sample vessels 8 are provided on a sample rack 9. The sample conveying mechanism 7 conveys the sample rack 9 to the inside of the automatic analyzer.

The automatic analyzer is provided with a reagent disk 11 to store a reagent vessel 10. The reagent disk 11 is capable of storing plural reagent vessels 10. The reagent disk 11 rotates to move or withdraw the reagent vessel 10 corresponding to an analysis item.

The automatic analyzer dispenses the sample with a sample dispensing mechanism 12 from the sample vessel 8 to the reaction cell 4. The sample dispensing mechanism 12 is provided with a sample probe 13 to dispense the sample to the reaction cell 4.

The automatic analyzer dispenses the reagent with a reagent dispensing mechanism 14 from the reagent vessel 10 to the reaction cell 4. The reagent dispensing mechanism 14 is provided with a reagent probe 15 to dispense the reagent to the reaction cell 4.

The automatic analyzer is provided with a stirring mechanism 16 to stir a liquid mixture of the sample and the reagent in the reaction cell 4. The stirring mechanism 16 is, e.g., a contact-type stirring rod or a stirrer immersed in the liquid mixture, or non-contact type ultrasonic stirring not immersed in the liquid mixture.

The automatic analyzer is provided with a measuring part 17 to measure and detect absorbance, luminescence, or turbidity of the liquid mixture contained in the reaction cell 4. The automatic analyzer performs component analysis on the biological sample by using the measurement information detected with the measuring part 17. The measuring part 17 has a light source and a detector. The light source irradiates the liquid mixture with light. The detector detects the light arrived via the liquid mixture from the light source.

Further, a sample probe wash station 18 and a sample probe water drop removing mechanism 19 are provided within an operation range of the sample probe 13. A reagent probe wash station 20 and a reagent probe water drop removing mechanism 21 are provided within an operation range of the reagent probe 15. A stirring mechanism wash station 22 and a stirring mechanism water drop removing mechanism 23 are provided within an operation range of the stirring mechanism 16.

In the sample probe wash station 18, the sample probe 13 is washed with a washing liquid. In the reagent probe wash station 20, the reagent probe 15 is washed with the washing liquid. In the stirring mechanism wash station 22, the stirring mechanism 16 is washed with the washing liquid. That is, in the respective wash stations, the member to be washed is washed with the washing liquid. As the washing liquid, a detergent or pure water may be used. In the following embodiments, the washing liquid is pure water.

After the washing in the wash station, the washing liquid is attached to the probe and the stirring mechanism 16. In the sample probe water drop removing mechanism 19, water drops on the sample probe 13 are removed. In the reagent probe water drop removing mechanism 21, water drops on the reagent probe 15 are removed. In the stirring mechanism water drop removing mechanism 23, water drops on the stirring mechanism 16 are removed. The water drop removing mechanism is a drying component using vacuum suction, a blower to blow off the washing liquid with a wind, or a wiper to wipe off the washing liquid, or the like. That is, the respective water drop removing mechanisms perform an operation to remove the washing liquid attached to the member to be washed after washing of the member to be washed with the washing liquid.

As described above, the control unit 3 controls the respective mechanisms. For example, the control unit 3 performs various controls such as driving of the reagent probe and the sample probe, driving of the reaction disk, water drop removing control on the various water drop removing mechanisms, washing liquid discharge control on the wash stations, measurement-related control on the measuring part, and calculation of analysis result.

Figure 2:
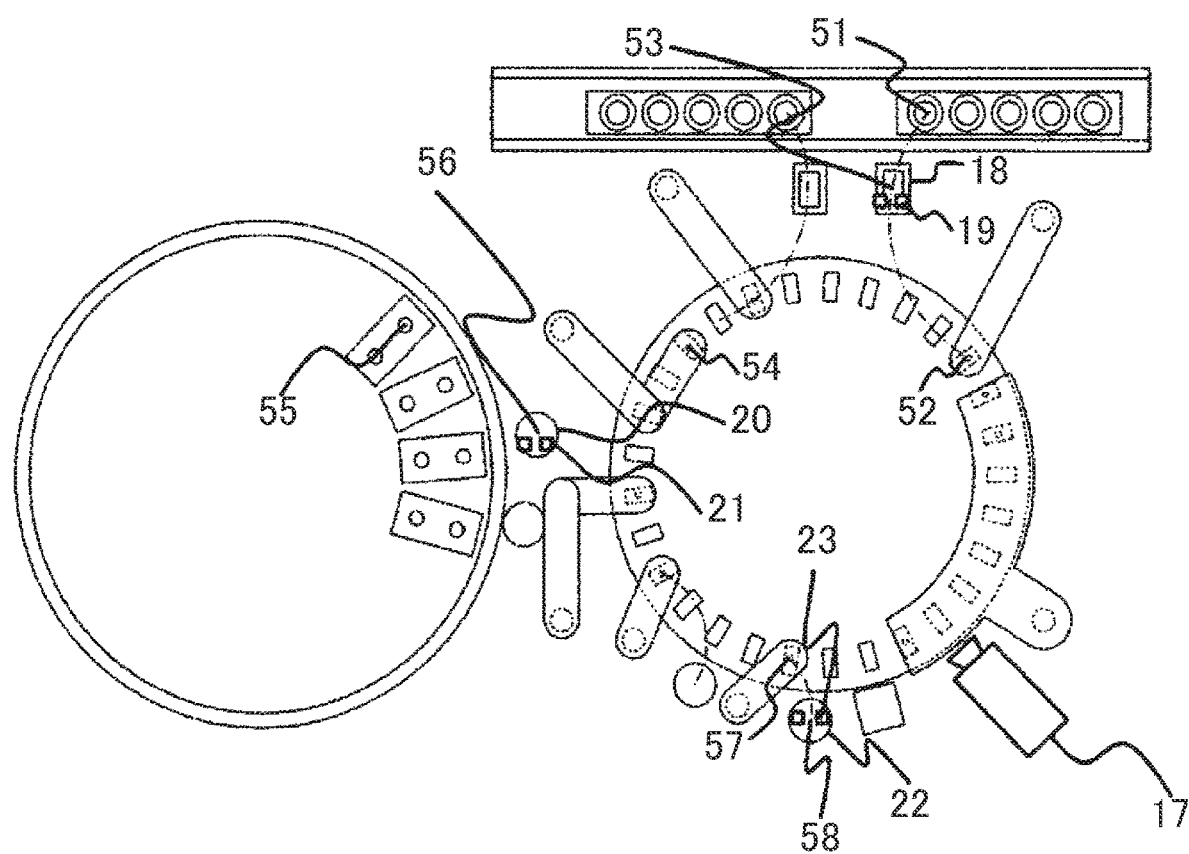
FIG. 2 is a schematic top plan view of the automatic analyzer to which the present invention has been applied.

FIG. 2 is a schematic top plan view of the automatic analyzer to which the present invention has been applied. Note that in the figure, the same reference numerals denote the same parts, and accordingly the repeated description will be omitted. Using FIG. 2, the analysis process will be described.

An operator registers respective analysis items with the computer 1 with respect to the sample vessel 8 containing a biological sample such as blood, blood plasma or urine (hereinbelow, referred to as a sample or a specimen).

The sample rack 9 on which the specimen is placed is set in the automatic analyzer with a specimen preprocessing system or the operator. The automatic analyzer conveys the specimen placed on the sample rack 9 with the sample conveying mechanism 7 to a sample aspiration position 51.

The automatic analyzer washes the reaction cell 4 with the reaction vessel washing mechanism 6 before the sample (specimen) is dispensed to the reaction cell 4. The reaction disk 5 rotates, and the washed reaction cell 4 moves to a sample discharge position 52.

The automatic analyzer moves the sample probe 13 to a sample probe washing position 53 in which the sample probe wash station 18 is provided, and washes the sample probe 13. After the washing of the sample probe 13, the automatic analyzer removes the washing water attached to the sample probe 13 with the sample probe water drop removing mechanism 19. The automatic analyzer moves the sample probe 13 to the sample aspiration position 51. The sample probe 13 aspirates the sample by an amount corresponding to the registered analysis items from the specimen in the sample vessel 8. The automatic analyzer moves the sample probe 13 which aspirated the sample to the sample discharge position 52, to discharge the aspirated sample to the reaction cell 4. After the discharge of the sample, the automatic analyzer moves the sample probe 13 to the sample probe washing position 53, and washes the sample probe 13 in the sample probe wash station 18.

The reaction disk 5 rotates, to move the reaction cell 4 which discharged the sample from the sample discharge position 52 to a reagent discharge position 54.

The automatic analyzer moves the reagent vessel 10 corresponding to the analysis item to a reagent aspiration position 55 by rotating the reagent disk 11.

The automatic analyzer moves the reagent probe 15 to a reagent probe washing position 56 in which the reagent probe wash station 20 is provided, and washes the reagent probe 15. After the washing of the reagent probe 15, the automatic analyzer removes the washing water attached to the reagent probe 15 with the reagent probe water drop removing mechanism 21. The automatic analyzer moves the reagent probe 15 to the reagent aspiration position 55. The reagent probe 15 aspirates the reagent by an amount corresponding to the registered analysis items from the reagent in the reagent vessel 10. The automatic analyzer moves the reagent probe 15 which aspirated the reagent to the reagent discharge position 54, to discharge the aspirated reagent to the reaction cell 4 in which the biological sample has been discharged. After the discharge of the reagent, the automatic analyzer moves the reagent probe 15 to a reagent probe washing position 56, and washes the reagent probe 15 in the reagent probe wash station 20.

When the stirring mechanism 16 is a contact type stirring rod or a stirrer, the automatic analyzer moves the stirring mechanism 16 to a stirring mechanism washing position 58 in which the stirring mechanism wash station 22 is provided, and washes the stirring mechanism 16. After the washing of the stirring mechanism 16, the automatic analyzer removes the washing water attached to the stirring mechanism 16 with the stirring mechanism water drop removing mechanism 23. The automatic analyzer moves the stirring mechanism 16 to a stirring position 57 to stir the liquid mixture.

When the stirring mechanism 16 is non-contact type ultrasonic stirring or the like, as a wash station is not required, the automatic analyzer moves the reaction cell 4 to the stirring position 57, to stir the liquid mixture.

The automatic analyzer measures the absorbance, the luminescence, or the turbidity of the liquid mixture in the reaction cell 4 with the measuring part 17, performs component analysis on the sample, and displays the result on the display unit of the computer 1.

The liquid mixture in the reaction cell 4 after the component analysis is disposed, and the reaction cell 4 is washed with the reaction vessel washing mechanism 6.

The analysis process in the automatic analyzer is as described above. This process includes three processes having a possibility of dilution of the object liquid. The first process is the aspiration of the sample with the sample probe 13 from the sample vessel 8. The second process is the aspiration of the reagent with the reagent probe 15 from the reagent vessel 10. The third process is the stirring of the liquid mixture in the reaction cell 4 with the stirring mechanism 16 such as a contact-type stirring rod or stirrer.

Figure 3:
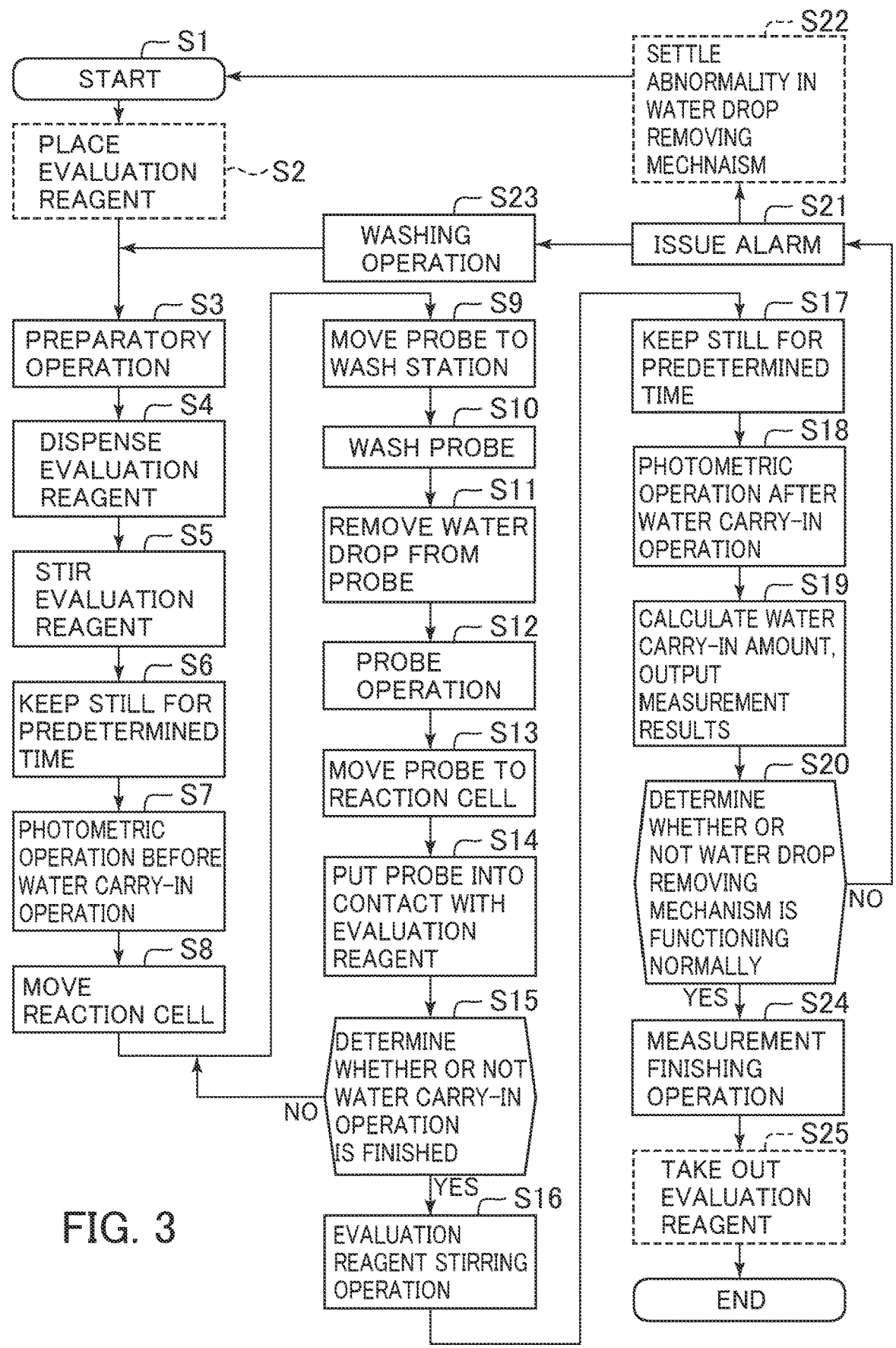
FIG. 3 is a flow of checking of the water carry-in amount of a probe according to the present invention.

FIG. 3 is a flow of checking of the water carry-in amount. An example where the absorbance is measured as measurement of optical characteristic of a water carry-in amount evaluation reagent will be described. The following flow is made with the control with the control unit 3. This checking is performed as maintenance or mechanism operation checking.

Using FIG. 3, the water carry-in amount checking with respect to the reagent probe 15 will be described.

At step 1 (S1), a user or the service person makes an order of water carry-in amount checking with respect to the computer 1. For example, there is an item of water carry-in amount checking among maintenance items, and a START button of the item may be pushed. Thus the order is made by a simple method.

At step 2 (S2), the evaluation reagent is provided on the reagent disk 11. When the water carry-in amount checking is ordered, the automatic analyzer requires the user or the service person of setting of the evaluation reagent. The user or the service person sets the reagent vessel 10 containing the evaluation reagent on the reagent disk 11. The evaluation reagent is a liquid having absorbance measurable with the measuring part 17 such as orange G aqueous solution with absorbance of 1 Abs. Note that in addition to the absorbance, the transmittance, the luminescence or the turbidity may be measured.

At step 3 (S3), a preparatory operation for the automatic analyzer is performed. The preparatory operation is checking the residual amount of the reagent, rotating the reaction disk 5 to move the reaction cell 4 to the reagent discharge position 54, and moving the evaluation reagent set on the reagent disk 11 to the reagent aspiration position 55.

At step 4 (S4), an evaluation reagent dispensing operation is performed. The evaluation reagent dispensing process is the same control method as the reagent dispensing in the analysis process in the automatic analyzer. The automatic analyzer moves the reagent probe 15 to the reagent probe washing position 56 in which the reagent probe wash station 20 is provided and washes the reagent probe 15 with the washing water. After the washing of the reagent probe 15, the automatic analyzer removes the washing water attached to the reagent probe 15 with the reagent probe water drop removing mechanism 21. The automatic analyzer moves the reagent probe 15 to the reagent aspiration position 55. The reagent probe 15 aspirates the evaluation reagent in the reagent vessel 10 by a fixed amount. The automatic analyzer moves the reagent probe 15 which aspirated the reagent to the reagent discharge position 54, to discharge the reagent to the reaction cell 4. After the discharging of the reagent, the automatic analyzer moves the reagent probe 15 to the reagent probe washing position 56, and washes the reagent probe 15 with the washing water in the reagent probe wash station 20.

At step 5 (S5), the evaluation reagent in the reaction cell 4 is stirred. The automatic analyzer moves the reaction cell 4 to which the evaluation reagent is dispensed to the stirring position 57, and stirs with the stirring mechanism 16. At this time, when non-contact type ultrasonic stirring is used as the stirring mechanism 16, it is not necessary to take the water carry-in amount with the stirring mechanism 16 into consideration.

At step 6 (S6), the rotation of the reaction disk 5 is stopped for a fixed period. The reaction cell 4 stops in the stirring position for a fixed period. The bubbles caused by the stirring of the evaluation reagent in the reaction cell 4 are settled and the temperature of the evaluation reagent is stabled.

At step 7 (S7), the absorbance of the evaluation reagent before water carry-in operation is measured. The reaction cell 4 to which the evaluation reagent is dispensed is moved to the measuring part 17, and the absorbance is measured. The absorbance at this time is pre-operation absorbance, and is reference of the evaluation reagent.

At step 8 (S8), the reaction cell 4 moves. The reaction cell 4 containing the dispensed evaluation reagent after the measurement of the absorbance is moved to the reagent discharge position 54.

The water carry-in operation is performed at step 9 (S9) to step 14 (S14).

At step 9 (S9), the reagent probe 15 moves to the reagent probe wash station 20.

At step 10 (S10), the reagent probe wash station 20 operates, to wash the reagent probe 15 with the washing water.

At step 11 (S11), the reagent probe water drop removing mechanism 21 operates, to remove the water drops on the reagent probe 15. Note that as the means of water drop removal, sucking, blowing, wiping as described above are given. Any one of these methods or a method different from these methods may be used; however, at least the water drop removing is performed based on the control with the control unit 3.

At step 12 (S12), the reagent probe 15 moves to the reagent aspiration position 55, to perform a reagent probe operation. The reagent probe operation here is an operation not accompanied with downward/upward aspiration movement of the reagent probe 15 and aspiration and discharging of the reagent so as not to prevent the reagent probe 15, which moves to the reagent aspiration position 55, from contact with the reagent. Note that step 12 (S12) is omittable, and may be omitted.

At step 13 (S13), the reagent probe 15 moves to the reagent discharge position 54. In the reagent discharge position 54, the reaction cell 4 to which the evaluation reagent is dispensed is provided.

At step 14 (S14), the reagent probe 15 performs a contact operation with respect to the evaluation reagent in the reaction cell 4. The reagent probe 15 moves downward into contact with the evaluation reagent. At this time, as only the water drops attached to the outer side of the reagent probe 15 are treated as the object of the water carry-in amount measurement, it is desirable to control not to perform the aspiration and discharging of the reagent. Further, it is desirable that the moving operation of the reagent probe 15 downward to the evaluation reagent and upward from the evaluation reagent is performed under the same control as that for aspirating of the reagent with the reagent probe 15 upon actual reagent dispensing operation. When water drops not removed with the reagent probe water drop removing mechanism 21 are attached to a position where the reagent probe 15 is in contact with the reagent, the evaluation reagent is diluted.

At step 15 (S15), it is determined whether or not the water carry-in operation is repeated. When the water carry-in operation is repeated, the process returns to step 9 (S9) to perform the water carry-in operation. The repetition may not be performed or may be performed one or more times. When the number of times of repetition is larger, the evaluation reagent is easily diluted, accordingly, it is preferable that the repetition is performed one or more times to easily find the difference of absorbance between before and after the water carry-in operation. That is, it is desirable that the water carry-in operation is performed plural times. Note that the determination here means checking as to whether or not the apparatus has performed the water carry-in operation by the number of times of repetition previously set on the apparatus side. When the number of times of repetition is not the set number of times of repetition, the determination of completion of the water carry-in operation is NO. The control unit 3 repeats the operation at step 9 to 14 (S9 to 14) until the set number of times is satisfied. When the number of times is satisfied, the determination of completion of the water carry-in operation is YES.

At step 16 (S16), the automatic analyzer stirs the evaluation reagent in the reaction cell 4. The reaction cell 4 to which the evaluation reagent is dispensed is moved to the stirring position 57, and the stirring is performed with the stirring mechanism 16. At this time, as in the case of step 5 (S5), when non-contact type ultrasonic stirring mechanism is used as the stirring mechanism 16, it is not necessary to take the water carry-in amount with the stirring mechanism 16 into consideration.

At step 17 (S17), the rotation of the reaction disk 5 is stopped for a fixed period. The reaction cell 4 stops in the stirring position 57 for a fixed period. The evaluation reagent in the reaction cell 4 is uniformly mixed with the carried-in water and is stabled.

At step 18 (S18), the absorbance of the evaluation reagent after the water carry-in operation is measured. The reaction cell 4 to which the evaluation reagent is dispensed is moved to the measuring part 17, and the absorbance is measured. The absorbance at this time is post-operation absorbance, and is used in water carry-in amount calculation.

At step 19 (S19), the water carry-in amount is calculated, and the measurement result is outputted. The absorbances before and after the water carry-in operation are compared with each other, then the water carry-in amount is calculated, and the measurement result is outputted to the display unit of the computer 1. The details will be described in FIG. 4. It is more preferable that steps S4 to S18 are repeated, to calculate data on the plural water carry-in amounts, and an average value is obtained from these amounts.

At step 20 (S20), it is determined whether or not the water drop removing mechanism normally functions. It is determined whether or not the calculated water carry-in amount or the average value of the water carry-in amounts is over a threshold value set in the automatic analyzer. When the calculated water carry-in amount or the average value is over the threshold value, the process proceeds to step 21 (S21).

At step 21 (S21), the automatic analyzer generates an alarm of water drop removing mechanism abnormality or the like to notify the user of the abnormality. For example, when the threshold value is set with a water carry-in amount of 0.15 µL and the calculated water carry-in amount or the average value is over this threshold value, it is determined that the function of the water drop removing mechanism is weakened. The automatic analyzer displays checking of fluid passage leakage related to the water drop removing mechanism, checking of clogging and contamination of the water drop removing mechanism, and the like, on the screen of the computer 1. Further, when the threshold value is set with a water carry-in amount of 0.30 µL and the calculated water carry-in amount or the average value is over the threshold value, it is determined that the function of the water drop removing mechanism does not work. The automatic analyzer displays information to urge connection checking related to the water drop removing mechanism on the screen of the computer 1. For example, the conceivable connection errors are disconnection between a tube and a pump for air discharge/suction, disconnection between a pump and a power source, and the like.

At step 22 (S22), with the alarm display, the user or the service person dissolves the abnormality of the water drop removing mechanism, and again orders the water carry-in amount checking.

At step 23 (S23), it may be configured such that when there is a fear of increase of water carry-in amount due to contamination of the probe or the like, the probe washing operation is performed again and the water carry-in amount checking is performed again.

When the water carry-in amount is not over the threshold value, it is determined that the amount is an allowable water carry-in amount, and the process proceeds to step 24 (S24).

At step 24 (S24), it is determined that water drop removing mechanism normally functions. Then a measurement completion operation such as disposing of the liquid mixture and washing of the reaction cell 4 is performed.

At step 25 (S25), the evaluation reagent is taken out from the reagent disk 11. The automatic analyzer requires the user or the service person to take out the evaluation reagent. The reagent vessel 10 containing the evaluation reagent is taken out from the reagent disk 11.

The flow of the water carry-in amount checking is as described above.

The operation in the checking flow is controlled in the same cycle period as that in the dispensing operation in the normal analysis process. Regarding the probe washing, as in the case of the reagent dispensing operation in the normal analysis process, both of internal washing and external washing are performed such that the amount of water drops attached to the probe is in the same condition as that in the normal operation as much as possible.

Briefly three points are different from the normal analysis process.

The first point is at step 12 (S12). Generally the probe moves to the aspiration position, then the probe moves down, and the probe arrives at the liquid surface, to aspirate the liquid, and the probe rises. On the other hand, in the probe operation according to the present invention, the probe is controlled not to arrive at the liquid surface, not to aspirate the liquid.

The second point is at step 14 (S14). Generally the probe moves down above the reaction cell 4, discharges the liquid, then the probe rises, and moves to the wash station. On the other hand, in the probe contact operation according to the present invention, the probe moves down until it is in contact with the evaluation reagent in the reaction cell 4, and further, the prove is controlled not to discharge the liquid.

The third point is at step 12 (S12). Generally the reaction disk 5 rotates by a fixed period to move the reaction cell 4. On the other hand, when the water carry-in operation is performed plural times in the present invention, as the probe is brought into contact with the same reaction cell 4, the reaction disk 5 is controlled not to rotate.

When the water carry-in operation is performed plural times, it may be configured such that the reaction cell 4 is moved to the stirring position 57 by each water carry-in operation, and the evaluation reagent in the reaction cell 4 is stirred. Note that when the stirring is performed by each water carry-in operation, although it is advantageous that the evaluation reagent in the reaction cell 4 is mixed with the carried-in water and becomes uniformed, it is disadvantageous that a bubble layer is caused by the stirring on the liquid surface of the evaluation reagent in the reaction cell 4, and the liquid surface is different from that in a general liquid surface environment where the bubbles in the vessel are removed. Accordingly, it is desirable that the stirring of the evaluation reagent is not performed by each water carry-in operation, and the water carry-in operation is performed plural times in a state where the reaction disk is stopped.

FIG. 4 is an example of an output diagram of measurement results in the automatic analyzer to which the present invention has been applied. Using FIG. 4, an example of the water carry-in amount calculation method will be described.

FIG. 4 is an output diagram of measurement results when the absorbances before and after the water carry-in operation are compared with each other, then the water carry-in amount is calculated with the computer 1, and the measurement result is outputted to the display unit of the computer 1, at step 19 (S19).

In the flow of FIG. 3, the dispensing amount of the evaluation reagent is 150 μL, the water carry-in operation (from S9 to S14) is repeated ten times, and the water carry-in amount checking (from S4 to S18) is repeated three times.

As the water carry-in amount checking is repeated three times, there are three reaction cells 4 (60:line 1). As the wavelengths measured with a photometric operation before the water carry-in operation at step 7 (S7), when e.g. orange G is used as the evaluation reagent, a main wavelength of 480 nm, a sub wavelength of 570 nm, and the difference between the main wavelength and the sub wavelength are used (61:line 2), the absorbances on the respective wavelengths are measured and calculated (62:line 3). The wavelengths and the absorbance measured after the water carry-in operation at step 18 (S18) in FIG. 3 are the same (63:line 4).

A water carry-in amount D μL per each dispensing is calculated from the following expression, and displayed as the water carry-in amount (64:line 5).

$$D\ \mu L = 150 \mu \times L\ ((\text{pre-operation absorbance (main-sub)}) - (\text{post-operation absorbance (main-sub)})) / (\text{post-operation absorbance (main-sub)}) / \text{ten times of water carry-in operation}$$

As the water carry-in amount checking is repeated, an average value is calculated from the water carry-in amounts calculated in the respective reaction cells 4, and the average value is displayed (65: average value). According to this example, since the average is 0.33 μL/each time, it corresponds to a connection error in the above-mentioned example of the threshold value. Accordingly, it is determined that the function of the water drop removing mechanism does not work, and information to urge connection checking related to the water drop removing mechanism is displayed on the screen of the computer 1.

It is understood from the above flow that, merely by setting the evaluation reagent, it is possible to automatically calculate the water carry-in amount and it is possible to easily check whether or not the water drop removing mechanism is in normal conditions. With this invention, it is possible to improve the reliability of the mechanical operation of the apparatus.

In the present embodiment, it is possible to automatically calculate the water carry-in amount with the reagent probe 15 without adding any new part. As the user's work, he/she merely orders the automatic analyzer by using the computer 1, sets the reagent vessel 10 containing the evaluation reagent on the reagent disk 11, and takes the vessel out. It is possible to easily measure the water carry-in amount by automatically performing all the remaining operations, i.e., dispensing of the dye solution to an absorption cell by a fixed amount, absorbance measurement in the absorption cell, and repetition operation of these operations, with the apparatus. Further, it is possible to check that the water drop removing mechanism normally functions. Further, it is possible to prevent the possibilities of degradation of measurement result such as reduction of measurement range and measurement error due to water carried in the reagent.

Second Embodiment

Next, a second embodiment of the present invention will be described.

In the first embodiment, the measurement of the water carry-in amount with the reagent probe 15 is described. In the second embodiment, the change in comparison with the first embodiment is the measurement of the water carry-in amount with the sample probe 13.

The measurement of the water carry-in amount with the sample probe 13 is performed in the approximately same flow of FIG. 3. The change in the operation will be described next.

At step 8 (S8), to measure the water carry-in amount with the sample probe 13, the reaction cell 4 is moved to the sample discharge position 52.

At step 9 (S9), the sample probe 13 moves to the sample probe wash station 18.

At step 10 (S10), the reagent probe wash station 18 operates, to wash the sample probe 13.

At step 11 (S11), the sample probe water drop removing mechanism 19 operates, to remove the water drops on the sample probe 13.

At step 12 (S12), the sample probe 13 moves to the sample aspiration position 51, and perform a sample probe operation. The sample probe operation here is an operation to move the sample probe 13 to the sample aspiration position 51, but not to perform aspiration downward/upward movement of the sample probe 13 and aspirating and discharging of the sample so as to avoid contact between the sample probe 13 and the sample.

At step 13 (S13), the sample probe 13 moves to the sample discharge position 52. The reaction cell 4 to which the evaluation reagent is dispensed is provided in the sample discharge position 52.

At step 14 (S14), the sample probe 13 performs a contact operation with respect to the evaluation reagent in the reaction cell 4. The sample probe 13 moves downward to be in contact with the evaluation reagent. At this time, to handle only the water drops attached to the outer side of the sample probe 13 as the object of water carry-in amount measurement, control is performed not to perform the aspirating and discharging of the reagent. Further, the movement of the sample probe 13 downward to the evaluation reagent and upward from the evaluation reagent is made with the same control upon operation of the sample probe 13 to aspirate the sample upon actual sample dispensing operation. When the water drops, not removed with the sample probe water drop removing mechanism 19, remain in a part where the sample probe 13 comes into contact with the sample, the evaluation reagent is diluted.

The change in the second embodiment from the first embodiment is as described above.

The evaluation reagent may be dispensed to the reaction cell 4 by using the sample probe 13. It is necessary to accurately dispense by an amount sufficient for stirring and photometry.

As described above, the automatic analyzer according to the present embodiment enables the water carry-in amount checking with respect to the sample probe 13.

Third Embodiment

Next, a third embodiment of the present invention will be described.

In the first and second embodiments, the member to be washed is the reagent probe or the sample probe. The water carry-in amount with the probe is measured, and the water drop removing mechanism is evaluated. In the third embodiment, as the changes in comparison with the first and second embodiments, the member to be washed is the stirring mechanism 16 to be in contact with the liquid in the reaction cell and to stir the liquid, and the water carry-in amount with the contact-type stirring rod or a stirrer, having the possibility of water carry-in upon stirring, is measured.

Figure 5:
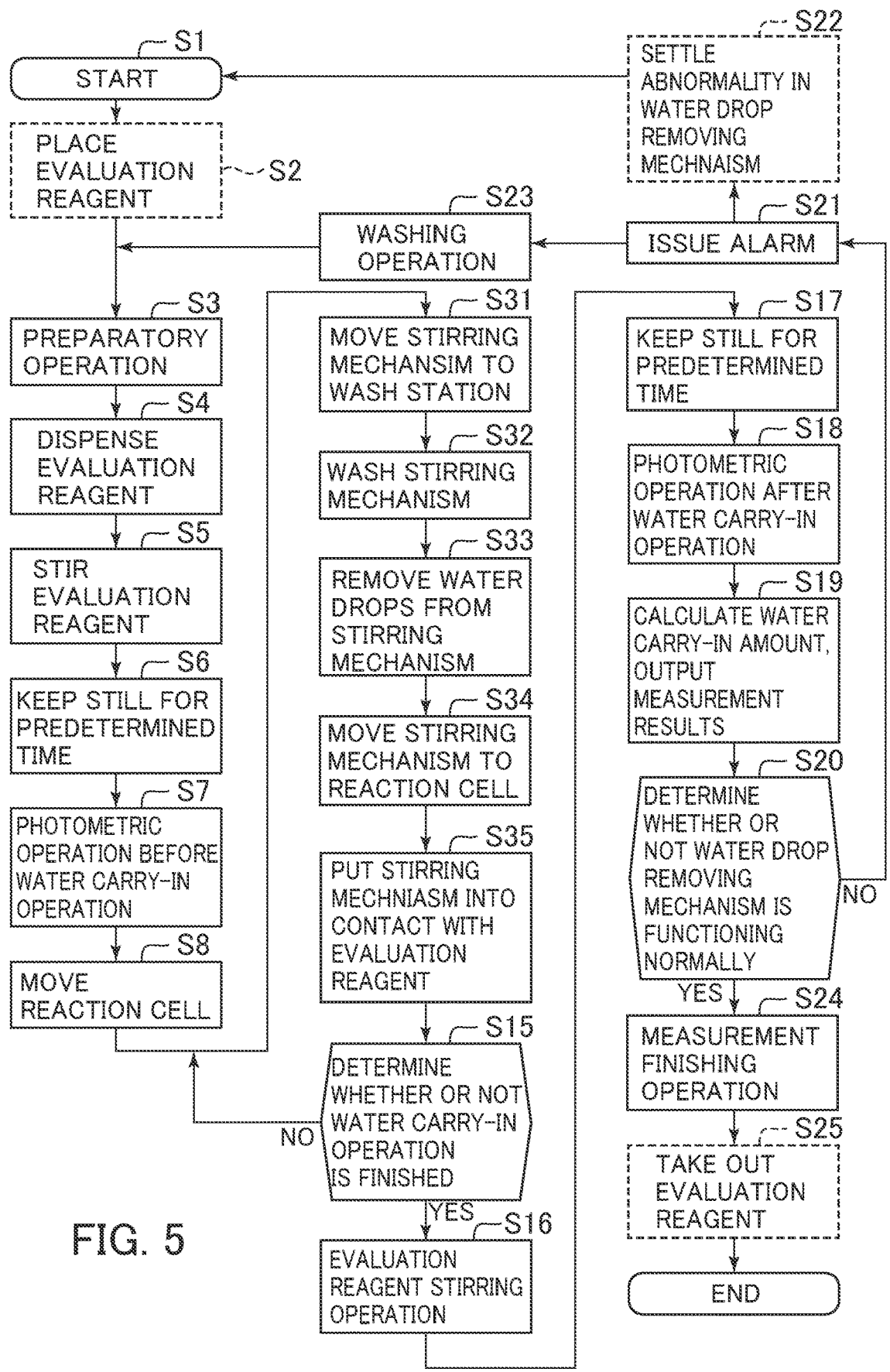
FIG. 5 is a flow of checking of the water carry-in amount of a stirring mechanism according to the present invention.

FIG. 5 is a flow of the checking of the water carry-in amount in the stirring mechanism 16. In FIG. 5, steps S9 to S14 in FIG. 3 are changed to steps S31 to S35. The measurement of the water carry-in amount with the stirring mechanism 16 is made in approximately the same flow as that of FIG. 3. The changes in the operation will be described next.

At step 8 (S8), the reaction cell 4 moves. The reaction cell 4, containing the dispensed evaluation reagent after the measurement of the absorbance, is moved to the stirring position 57.

At step 31 (S31), the stirring mechanism 16 moves to the stirring mechanism wash station 22.

At step 32 (S32), the stirring mechanism wash station 22 operates, to wash the stirring mechanism 16.

At step 33 (S33), the stirring mechanism water drop removing mechanism 23 is operated, to remove the water drops on the stirring mechanism 16.

At step 34 (S34), the stirring mechanism 16 moves to the stirring position 57. The reaction cell 4, to which the evaluation reagent is dispensed, is provided in the stirring position 57.

At step 35 (S35), the stirring mechanism 16 performs a contact operation with respect to the evaluation reagent in the reaction cell 4. The stirring mechanism 16 moves downward into contact with the evaluation reagent. At this time, the stirring operation may be performed or may not be performed. Note that unlike the case of the probe, in the case of the stirring mechanism 16, since it moves down to a deeper position and is immersed in the evaluation reagent, the stirring mechanism 16 is immersed in the evaluation reagent. Further, the operation of the stirring mechanism 16 to move downward to the evaluation reagent and upward from the evaluation reagent is performed under the same control as that for the stirring with the stirring mechanism 16 upon actual stirring operation. When water drops not removed with the stirring mechanism water drop removing mechanism 23 are attached to a part where the stirring mechanism 16 is in contact with the reagent, the evaluation reagent is diluted.

At step 16 (S16), when the stirring operation is not performed at step 35 (S35), the evaluation reagent in the reaction cell 4 is stirred. Unlike the first and second embodiments, upon stirring of the reagent after the water carry-in operation and before the photometric operation, the number of times of water carry-in with the stirring rod or the stirrer is larger by the stirring at step 16 (S16). Accordingly, upon calculation of the water carry-in amount at step 19 (S19), the calculation is made while the large number of times of water carry-in operations is taken into consideration.

The operation in the present invention is controlled with the same cycle period as that of the stirring operation in the normal analysis process.

Regarding washing of the stirring mechanism 16, the operation is made as in the case of the stirring operation in the normal analysis process, such that the amount of water drops attached to the stirring mechanism 16 is in the same condition as that in the normal operation as much as possible.

There are briefly two points different from the normal analysis process.

The first point is at step 35 (S35). Generally the stirring mechanism 16 operates, on the other hand, the stirring mechanism 16 may be controlled not to operate.

The second point is at step 35 (S35). Generally the reaction disk 5 rotates to move the reaction cell 4 by a fixed period. On the other hand, when the water carry-in operation is performed plural times in the present invention, the reaction disk 5 is controlled not to rotate such that the stirring mechanism 16 is brought into contact with the same reaction cell 4.

When the water carry-in operation is performed plural times, the stirring operation may or may not be performed at step 35 (S35). It is advantageous that the evaluation reagent in the reaction cell 4 is mixed with the carried in water and becomes uniform. However, a bubble layer is caused on the liquid surface of the evaluation reagent in the reaction cell 4 by the stirring. It is disadvantageous that the liquid surface is different from that in a liquid surface environment of the liquid mixture after the discharging of the reagent. Accordingly, it is desirable that the water carry-in operation is performed plural times in a state where the reaction disk is stopped, without stirring of the evaluation reagent, by each water carry-in operation.

As described above, the automatic analyzer according to the present embodiment enables the water carry-in amount checking with respect to the contact type stirring mechanism 16 such as a stirring rod or a stirrer.

As described above, the first to third embodiments have been described.

According to the present embodiments, it is possible to calculate the water carry-in amount in the respective mechanisms as a cause of water carry-in, and it is possible to determine whether or not the water drop removing mechanism normally functions. More particularly, the control unit brings the member to be washed, washed in the wash station, into contact with the evaluation reagent, then the control unit causes the measuring part to measure optical characteristic after the contact with the evaluation reagent, and calculates the carry-in amount of the washing liquid with the member to be washed based on the measured optical characteristic.

In the first and second embodiments, when the stirring mechanism 16 is not a non-contact ultrasonic stirring but a contact-type stirring rod or a stirrer as described in the third embodiment, it may be configured such that the water carry-in amount with the stirring mechanism 16 in the third embodiment is first measured, then upon calculation of the water carry-in amount with the probe, the water carry-in amount with the stirring mechanism 16 is subtracted so as to eliminate the influence of the water carry-in amount with the stirring mechanism 16.

Further, it is desirable that the control unit causes the measuring part to measure the optical characteristic before the contact with the evaluation reagent, and based on the optical characteristic of the member to be washed before and after the contact, calculates the carry-in amount of the washing liquid with the member to be washed to the reaction cell. It is possible to use a previously-determined optical characteristic value as reference, further, by using the optical characteristic before the contact as reference, it is possible to offset the influence of the deterioration of the reaction cell itself and it is possible to calculate a carry-in amount with high accuracy.

Further, it is desirable that the control unit causes the member to be washed, after the operation to remove the washing liquid attached to the member to be washed with the water drop removing mechanism, to come into contact with the evaluation reagent. With this configuration, when the carry-in amount is larger than a threshold value as a reference value, it is possible to grasp abnormality of the water drop removing mechanism.

Further, it is desirable that the member to be washed is a dispensing probe as any one of the reagent probe and the sample probe, and the control unit performs control to reciprocate the dispensing probe plural times between the same reaction cell and the wash station, and performs control to repeat the series of operations including the washing operation for the dispensing probe with the washing liquid, the removal operation for the washing liquid attached to the dispensing probe with the water drop removing mechanism, and the contact operation for the dispensing probe with respect to the evaluation reagent. By performing the washing liquid carry-in operation in the evaluation reagent contained in the reaction cell plural times, it is possible to clarify the difference between optical characteristic between and after water carry-in operation, and it is possible to calculate the water carry-in amount with one water carry-in operation with high accuracy.

Further, it is desirable that plural reaction cells are provided in addition to the reaction cell to contain the evaluation reagent, the rotate-driven reaction disk is provided, the control unit controls the rotation driving of the reaction disk upon sample analysis, and the control unit performs control to continuously stop the reaction disk while the above series of operations are repeated. Upon sample analysis, the rotation driving and stop are periodically repeated with respect to the reaction disk. When the washing liquid carry-in operation is performed plural times, by performing the operation while stopping the reaction disk, it is possible to perform the contact operation plural times in a short time. In a case where the same reaction disk as that upon sample analysis is controlled, when the contact operation is performed once, it takes considerable amount of time before the same reaction cell comes to the same access position to the dispensing probe. Accordingly, by keeping the reaction disk stopped, it is possible to suppress delay of the second contact operation.

Further, it is desirable that upon sample analysis, the control unit performs the aspirating and the discharging of the dispensing object liquid with the dispensing probe and the washing of the dispensing probe in a predetermined cycle period (e.g. 3.6 seconds), and the control unit performs the above series of operations in the same predetermined cycle period. Since the checking of the water carry-in amount is included in the operation checking, it is not necessary to match the period of the checking to the cycle period upon sample analysis. However, by matching the cycle period, it is possible to estimate the water carry-in amount with the water drop amount caused in the operation upon dispensing. Further, it is possible to reduce special operation sequences since many operation sequences are shared.

Further, it is desirable that a reagent disk to hold a reagent vessel containing the evaluation reagent is provided, the dispensing probe is the reagent probe, the reagent probe is used for dispensing the evaluation reagent from the reagent vessel to the reaction cell, then upon sample analysis, the control unit performs control to horizontally move the reagent probe from the washing position to the reagent aspiration position, then move the probe downward from the reagent aspiration position to aspirate the reagent, then upon aspiration of the evaluation reagent from the reagent vessel, the control unit performs control to move the probe downward from the reagent aspiration position to aspirate the evaluation reagent, and when the above series of operations are repeated, the control unit performs control to perform contact operation with respect to the evaluation reagent contained in the reagent vessel, without moving the probe from the washing position to the reagent aspiration position then performing the contact operation with respect to the evaluation reagent contained in the reaction cell, so as to mix the washing liquid attached to the reagent probe in the evaluation reagent on the reaction cell side without mixing the washing liquid in the reagent vessel before the second contact operation. Further, by moving the probe to the reagent aspiration position, the operation sequence is shared upon analysis. Note that as a way of preventing the contact operation with respect to the evaluation reagent, two ways may be given, i.e., preventing the reagent probe from moving downward from the reagent aspiration position at all, and partially moving the probe downward but preventing the probe from contact with the surface of the evaluation reagent. Either of these ways may be employed.

Further, it is desirable that the control unit performs control to, after the repetition of the above series of operations, rotate the stopped reaction disk, then move the reaction cell to a position in which stirring is possible with respect to the evaluation reagent contained in the reaction cell and the washing liquid mixed in the evaluation reagent via the dispensing probe, and the control unit performs control to stir the evaluation reagent and the washing liquid in this position. By stirring, the degree of dilution of the evaluation reagent with the washing liquid is uniformed, and it is possible to perform high-accuracy carry-in amount measurement. Note that the stirring is desirably performed in non-contact manner with respect to the evaluation reagent, but the stirring may be performed with a contact type stirring mechanism.

Further, as a particular example, the evaluation reagent was an orange G/saline solution with absorbance of 1 Abs. Further, to prevent occurrence of bubbles impeding photometry in the evaluation reagent, an evaluation reagent with a surfactant added may be used. Further, as long as the absorbance is measured, another dye solution may be used as the evaluation reagent.

In the embodiments, with respect to the measurement of the evaluation reagent, the absorbance as the optical characteristic and the photometer to measure the absorbance as the measuring part 17 are shown as an example. The present invention is not limited to the absorbance and the photometer to measure the absorbance. The optical characteristic may be any one of transmittance, luminescence, and turbidity. Further, a measuring part corresponding to measured optical characteristic may be employed. That is, the type of optical characteristic does not matter as long as it changes depending on the washing liquid carry-in amount to the reaction cell. For example, regarding the luminescence, the measuring part may be a photo detector to detect luminescence amount per unit area. The carry-in amount of the washing liquid to the reaction cell may be calculated by detecting the luminescence amount per unit area decreasing in correspondence with washing liquid carry-in amount. Further, regarding the turbidity, the measuring part may be a scattered light detector to detect a scattered light amount which changes in correspondence with washing liquid carry-in amount. The carry-in amount of the washing liquid to the reaction cell may be calculated in correspondence with change of scattered light amount. When the luminescence or the turbidity is used, a measuring part to measure the absorbance of the liquid mixture separately contained in the reaction cell 4 for sample analysis is provided. On the other hand, upon sample analysis as in the case of the embodiments, as a photometer to measure the absorbance of the liquid mixture of the sample and the reagent, when the measuring part 17 is shared for analysis and for washing liquid carry-in amount measurement, it is possible to measure the washing liquid carry-in amount without addition of any new measuring part.

Further, it is desirable that the absorbance is used as the optical characteristic, and the control unit calculates the carry-in amount of the washing liquid with the member to be washed to the reaction cell based on the difference between the absorbance's before and after the contact with the evaluation reagent. The water carry-in amount is calculated by using the calculation expression described in the first embodiment. Note that the water carry-in amount may be calculated by using other expressions than the expression described in the first embodiment. Further, a calculation method of storing a table holding previously obtained relationship between the absorbance of the evaluation reagent and the water carry-in amount in the storage unit of the apparatus, and outputting the water carry-in amount by inputting the absorbance's before and after the contact, may be used.

Further, it is desirable that a storage unit to store a carry-in amount threshold value for determination as to whether or not the water drop removing mechanism normally functions is provided, and the control unit determines whether or not the water drop removing mechanism normally functions based on the calculated carry-in amount and the threshold value. In this case, the configuration where the apparatus automatically determines whether or not the water drop removing mechanism normally functions is superior to the case where the numerical value of the carry-in amount is displayed on the screen of the apparatus as a numerical value and the user or the service person determines whether or not the value is normal.

Further, it is desirable that the member to be washed is the reagent probe, the optical characteristic is the absorbance, the measuring part is a photometer to measure the absorbance of the liquid mixture of the sample and the reagent upon sample analysis, further, the water drop removing mechanism to perform an operation to remove the washing liquid attached to the reagent probe after washing of the reagent probe with washing liquid, the reagent disk to hold the reagent vessel containing the evaluation reagent, and the sample probe are provided, the control unit dispenses the evaluation reagent from the reagent vessel to the reaction cell, and the control unit calculates the carry-in amount of the washing liquid not removed with the water drop removing mechanism to the reaction cell. Especially, although the invention is not limited to the presumption of use of the reagent probe, the absorbance, and the water drop removing mechanism, it is possible with this configuration to grasp abnormality of the water drop removing mechanism for the reagent probe without adding any new measuring part.

Note that the present invention is not limited to the above-described embodiments, but includes various modifications. For example, the above embodiments have been described in detail for explaining the present invention, and the invention is not necessarily limited to an embodiment having all the described constituent elements. Further, some of constituent elements of an embodiment may be replaced with those of another embodiment. Further, constituent elements of an embodiment may be added to those of another embodiment. Further, it is possible to perform addition/deletion/replacement with respect to a part of constituent elements of the respective embodiments with other constituent elements.

DESCRIPTION OF THE REFERENCE CHARACTERS

1: Computer
2: Input device
3: Control unit
4: Reaction cell
5: Reaction disk
6: Reaction vessel washing mechanism
7: Sample conveying mechanism
8: Sample vessel
9: Sample rack
10: Reagent vessel
11: Reagent disk
12: Sample dispensing mechanism 13: Sample probe
14: Reagent dispensing mechanism
15: Reagent probe
16: Stirring mechanism
17: Measuring unit
18: Sample probe wash station
19: Sample probe water drop removing mechanism
20: Reagent probe wash station
21: Reagent probe water drop removing mechanism
22: Stirring mechanism wash station
23: Stirring mechanism water drop removing mechanism
51: Sample aspiration position
52: Sample discharge position
53: Sample probe washing position
54: Reagent discharge position
55: Reagent aspiration position
56: Reagent probe washing position
57: Stirring position
58: Stirring mechanism washing position
60: Line 1
61: Line 2
62: Line 3
63: Line 4
64: Line 5
65: Average

The invention claimed is:

1. An automatic analyzer comprising:
a member to be washed that is any one of a reagent probe for dispensing a reagent into a reaction cell, a sample probe for dispensing a sample into a reaction cell, and a stirring mechanism for contacting and stirring a liquid in a reaction cell;
a wash station in which the member to be washed is washed with a washing liquid;
a measuring part for measuring an optical characteristic of an evaluation reagent contained in a reaction cell;
a water drop removing mechanism that operates to remove the washing liquid adhered to the member to be washed, after the member to be washed is washed with the washing liquid;
a controller for controlling the member to be washed, the wash station, the measuring part, and the water drop removing mechanism,
wherein the controller is configured to perform control to:
cause the member to be washed that has been washed in the wash station to come into contact with the evaluation reagent,
cause the measuring part to measure the optical characteristic after the contact with the evaluation reagent, and calculate the amount of the washing liquid carried into the reaction cell by the member to be washed, based on the measured optical characteristic,
cause the member to be washed to come into contact with the evaluation reagent after the operation of removing the washing liquid adhered to the member to be washed is conducted by the water drop removing mechanism,
before causing the measuring part to measure the optical characteristic, cause the member to be washed to reciprocate between the same reaction cell and the wash station a plural number of times, and repeat a series of operations inclusive of:
an operation of washing the member to be washed with the washing liquid, an operation of removing the washing liquid adhered to the member to be washed by the water drop removing mechanism, and an operation of causing the member to be washed to come into contact with the evaluation reagent.

2. The automatic analyzer according to claim 1,
wherein the controller is further configured to perform control to cause the measuring part to measure the optical characteristic before the contact with the evaluation reagent, and calculate the amount of the washing liquid carried into the reaction cell by the member to be washed, based on the optical characteristic before the contact of the member to be washed and that after the contact.

3. The automatic analyzer according to claim 1,
further comprising a reaction disk which is provided with the reaction cell and a plurality of other reaction cells and which is driven to rotate,
wherein the control unit controls rotational drive of the reaction disk when analyzing a sample, and
the controller is further configured to perform control to keep the reaction disk still while the series of operations are repeated.

4. The automatic analyzer according to claim 3,
wherein the controller is further configured to perform control to:
perform aspiration and discharge of a liquid to be dispensed at the dispensing probe and washing of the dispensing probe within a predetermined cycle time when analyzing a sample, and
perform the series of operations within the predetermined cycle time.

5. The automatic analyzer according to claim 3,
further comprising a reagent disk that holds a reagent vessel for containing the evaluation reagent,
wherein the dispensing probe is the reagent probe, which dispenses the evaluation reagent from the reagent vessel into the reaction cell,
the controller is further configured to perform control to:
move the reagent probe in a horizontal direction from a washing position to a reagent aspiration position when analyzing a sample,
lower the reagent probe from the reagent aspiration position and aspirate the evaluation reagent when aspirating the evaluation reagent from the reagent vessel, and
move the probe from the washing position to the reagent aspiration position and perform an operation of bringing the probe into contact with the evaluation reagent contained in the reaction cell without performing an operation of bringing the probe into contact with the evaluation reagent contained in the reagent vessel in a case of repeating the series of operations.

6. The automatic analyzer according to claim 3,
wherein the controller is further configured to perform control to:
rotate the reaction disk having been kept still to move the reaction cell to a position where the evaluation reagent contained in the reaction cell and the washing liquid mixed into the evaluation reagent through the dispensing probe can be stirred, after the series of operations are repeated, and
stir the evaluation reagent and the washing liquid at the position.

7. The automatic analyzer according to claim 1,
wherein the optical characteristic is any one of absorbance, transmittance, luminescence, and turbidity.

8. The automatic analyzer according to claim 1,
wherein the optical characteristic is absorbance,
the measuring part is a photometer that measures absorbance of a mixture of a sample and a reagent when analyzing a sample, and the controller is further configured to perform control to calculate the amount of the washing liquid carried into the reaction cell by the member to be washed, based on a difference between the absorbance before contact with the evaluation reagent and that after the contact.

9. The automatic analyzer according to claim 1, further comprising a storage part that stores a threshold of the carry-in amount for determining whether or not the water drop removing mechanism is functioning normally, and the controller is further configured to perform control to determine whether or not the water drop removing mechanism is functioning normally, based on the calculated carry-in amount and the threshold.

10. The automatic analyzer according to claim 1, wherein the member to be washed is the reagent probe, the optical characteristic is absorbance, the measuring part is a photometer that measures absorbance of a mixture of a sample and a reagent when analyzing a sample, the automatic analyzer further comprises:
   a reagent disk that holds a reagent vessel for containing the evaluation reagent; and
   the sample probe, the controller is further configured to perform control to:
dispense the evaluation reagent from the reagent vessel to the reaction cell, and
calculate the amount of the washing liquid that cannot be removed by the water drop removing mechanism and is carried into the reaction cell.

* * * * *